United States Patent [19]
Ueno et al.

[11] Patent Number: 5,203,421
[45] Date of Patent: Apr. 20, 1993

[54] FAST REACTION STEERING MECHANISM

[75] Inventors: Katsumi Ueno, Okazaki; Takayuki Suganuma, Obu; Hiroyuki Masuda, Okazaki, all of Japan

[73] Assignee: Mitsubishi Jidosha Kogyo Kabushiki Kaisha, Tokyo, Japan

[21] Appl. No.: 875,540

[22] Filed: Apr. 27, 1992

Related U.S. Application Data

[63] Continuation of Ser. No. 582,140, Sep. 11, 1990, abandoned, which is a continuation of Ser. No. 342,286, Apr. 24, 1989, abandoned.

[30] Foreign Application Priority Data

| Apr. 27, 1988 | [JP] | Japan | 63-55845[U] |
| Feb. 17, 1989 | [JP] | Japan | 1-37426 |
| Feb. 17, 1989 | [JP] | Japan | 1-37427 |
| Feb. 17, 1989 | [JP] | Japan | 1-37428 |
| Feb. 17, 1989 | [JP] | Japan | 1-37429 |

[51] Int. Cl.$^5$ ............... B62D 5/02; B62D 5/06
[52] U.S. Cl. ............... 180/132; 180/79; 180/79.3; 180/141; 180/149
[58] Field of Search ............... 180/132, 79.1, 79.3, 180/79, 149, 141

[56] References Cited

U.S. PATENT DOCUMENTS

| 3,426,612 | 2/1969 | Biabaud | 180/143 X |
| 3,762,493 | 10/1973 | Hoganson | 74/388 PS X |
| 4,756,376 | 7/1988 | Shimizu | 180/79.1 |
| 4,765,425 | 8/1988 | Saito et al. | 180/79.1 |
| 4,855,655 | 8/1989 | Shimizu | 180/79.1 X |
| 4,865,145 | 9/1989 | Ijiri et al. | 180/79.1 |
| 4,877,098 | 10/1989 | Asanuma | 180/79.1 |
| 5,050,697 | 9/1991 | Umemura | 180/79.1 |

Primary Examiner—Mitchell J. Hill
Attorney, Agent, or Firm—Abelman Frayne & Schwab

[57] ABSTRACT

A fast reaction steering mechanism including a variable ratio gear mechanism connected in series with a speed increasing gear mechanism which is disposed in a steering transmission for transmitting rotation of a steering wheel to a steering gear box, the variable ratio gear mechanism comprising a first gear connected to the steering wheel having an effective radius gradually increasing with an increasing steering angle and a second gear connected to the steering box having an effective radius gradually decreasing with an increasing steering angle, and, with the steering angle at its central position, a smallest-radius portion of the first gear engaging with a largest-radius portion of the second gear, thereby providing a maximum steering angle by a reduced rotation of the steering wheel.

8 Claims, 8 Drawing Sheets

FAST REACTION STEERING MECHANISM

This application is a continuation of application Ser. No. 582,140 which is a continuation of U.S. application Ser. No. 342,286 filed Apr. 24, 1989, now abandoned.

BACKGROUND OF THE INVENTION

This invention relates to a steering mechanism which requires a reduced amount of steering wheel operation to steer the steered wheels up to their maximum steering angle.

Steering mechanisms commonly used in automobiles require more than one full turn of the steering wheel to achieve steering of the steered wheels up to their maximum steering angle. Such steering wheel operation constitutes a fatigue factor.

Therefore, a fast reaction steering mechanism which enables a large steering angle of the steered wheels by a small operation of the steering wheel has been in demand.

To meet such a requirement, the steering gear ratio can be set at a high value, as used in formula cars. However, if the gear ratio is increased, then, steering response in the vicinity of the central position of the steering wheel becomes oversensitive, and, a high speed corrective steering becomes difficult.

In such a fast reaction steering mechanism, since a large change in angle is produced in the steering wheels from a small change in steering angle of the steering wheel, it is preferable that the steering force be increased as the steering angle increases. In this manner, the steering angle is not abruptly increased even if the mechanism is carelessly operated by a driver who is accustomed to an ordinary steering system.

However, if a fast reaction is to be achieved simply by increasing the steering gear ratio, since the steering force is almost constant with respect to changes in steering angle, it is liable to cause excessively sharp steering, which constitutes a safety problem. If the steering force is set high to prevent such sharp steering, the steering force in the vicinity of the central position of the steering wheel also increases, which tends to increase the driver's fatigue.

SUMMARY OF THE INVENTION

It is a primary object of the present invention to provide a fast reaction steering mechanism in which the steering response and steering force increase as the steering wheel operation angle increases.

In accordance with the present invention, there is provided a fast reaction steering mechanism comprising a variable ratio gear mechanism and a speed-increase gear mechanism connected in series and disposed in a steering force transmission for mechanically connecting a steering wheel and steering gear box to transmit rotation of a steering wheel to a steering gear box.

The variable ratio gear mechanism comprises a first gear connected to the steering wheel having an effective radius which gradually increases with an increase in steering angle, and, a second gear connected to the steering box having effective radius which gradually decreases with an increase in steering angle.

When the steering wheel is at its central position, the smallest-radius portion of the first gear is in engagement with the largest-radius portion of the second gear, the speed increasing gear mechanism being disposed between an output shaft of the variable ratio gear mechanism and an input shaft of the steering box.

Thus, the present invention uses the variable ratio to obtain an increasing gear ratio with an increasing angle of the steering wheel, thereby preventing the steering response from becoming oversensitive in the vicinity of the central position of the steering wheel and reducing the required amount of steering wheel operation to the maximal angle of the steered wheels.

By virtue of the variable ratio gear mechanism, the steering force increases with increasing steering angle, thereby preventing abrupt steering of the steered wheels by careless manipulation by the driver.

An elliptical gear mechanism using a pair of elliptical gears can be used as the variable ratio gear mechanism.

A boosting mechanism to boost the output of the variable ratio gear mechanism can be disposed between the variable gear mechanism and the steering box, to allow conventionally used steering boxes and power-steering systems to be used, thereby reducing production costs of the steering system.

By the use of a counter-force mechanism disposed in the steering force transmission to increase the rotational resistance of the steering force transmission in response to increasing steering angle and/or vehicle speed, optimal steering force characteristics are provided that are related to the vehicle speed. Other features and advantages of the present invention will become apparent from the following description of the preferred embodiments.

DESCRIPTION OF THE PREFERRED EMBODIMENTS

Figure 1:
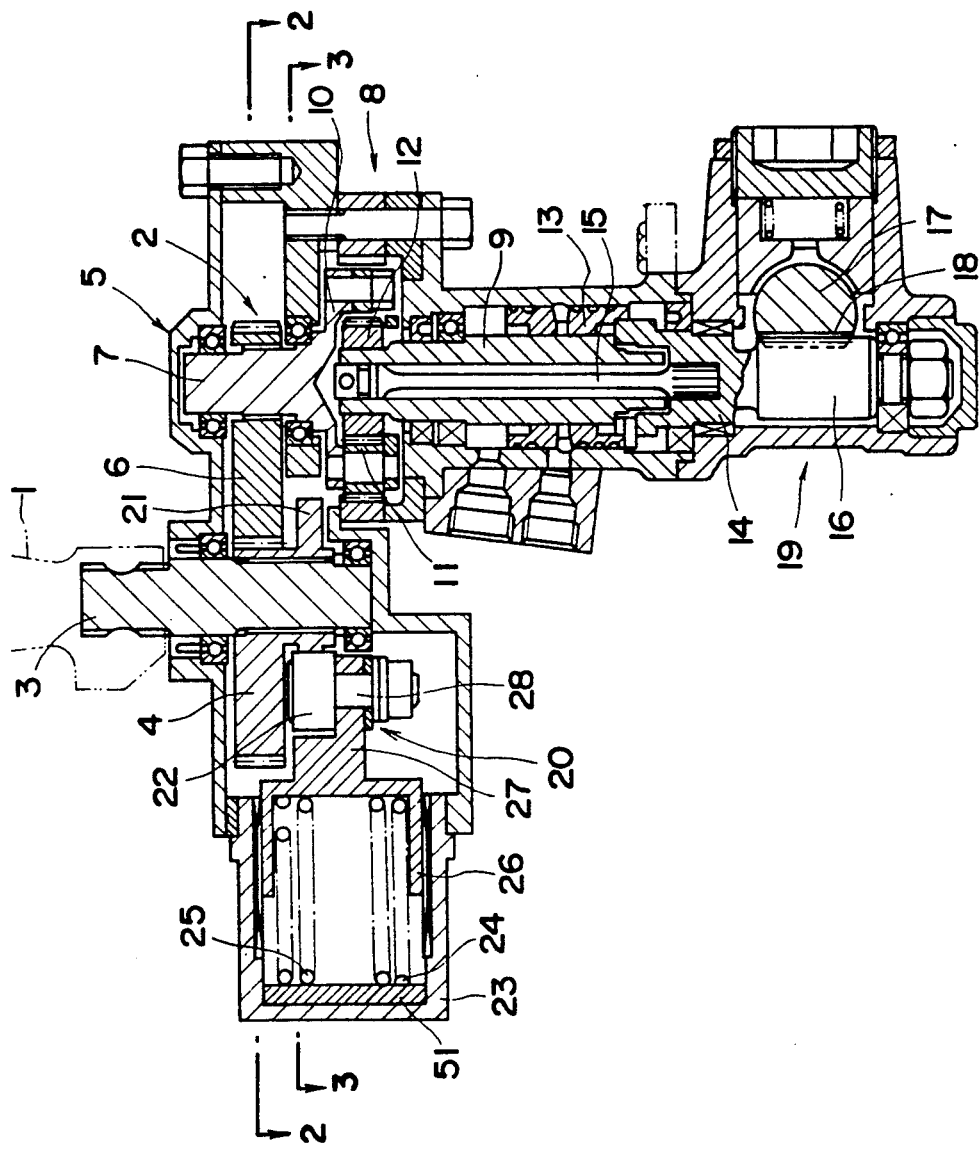
FIG. 1 is a schematic vertical sectional view of a first embodiment of the mechanism.

Referring to FIG. 1, the bottom end of a steering shaft 1 connected to a steering wheel (not shown) is connected by splines to the top of an input shaft 3 of an elliptical gear mechanism 2. A first elliptical gear 4 of the elliptical gear mechanism 2, at the inside of a casing 5, is fixed on the input shaft 3. The axis of the input shaft 3 is offset from the center of the first elliptical gear 4 along the major axis of the ellipse. A second elliptical gear 6 engages the first elliptical gear 4, and is fixed on an output shaft 7 extending parallel to the input shaft 3. The output shaft 7, as for the case of the input shaft 3, is offset from the center of the second elliptical gear 6 along the major axis of the ellipse.

Figure 2:
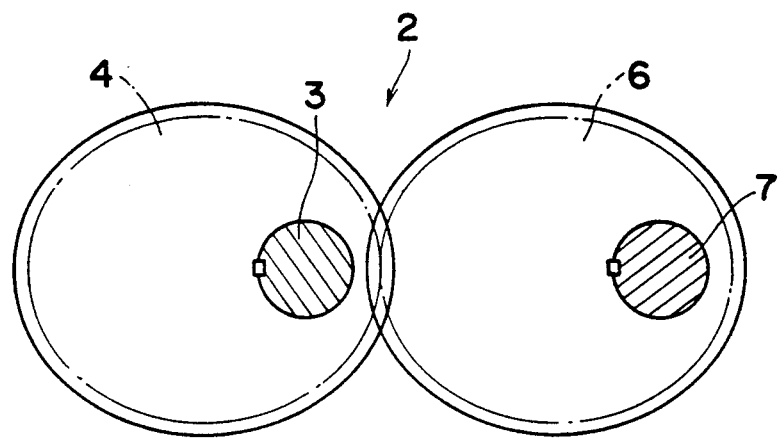
FIG. 2 is a schematic plan view of an elliptical gear mechanism.

As shown in FIG. 2, in the central position of the steering wheel (not shown), the smallest-radius portion of the first elliptical gear 4 engages with the largest-radius portion of the second elliptical gear 6. Thus, as the angle of rotation of the input shaft 3 increases with an increasing angle of rotation of the steering wheel, the gear ratio of the elliptical gear mechanism increases. In this embodiment, the maximal steering angle of the steering wheel is set to about a half turn (180 degrees).

As shown in FIG. 1, the output shaft 7 is connected to a shaft 9 of a conventional power steering device through a conventional planetary gear mechanism 8.

At its lower end, the output shaft 7 is integrally formed with a gear carrier 10 for a planetary gear mechanism 8, and, a plurality of gears 11 are rotatably supported on the gear carrier 10. A ring gear 12A of the planetary gear mechanism 8 is fixed to the casing 5 and engages with the planetary gears 11. A sun gear 12B of the planetary gear mechanism 8 is fixed to the top end of the shaft 9 and engages with the planetary gears 11.

The planetary gear mechanism 8 acts as a speed-increasing gear drive to increase the angle of rotation of the output shaft 7 and transmit it to the shaft 9. As a result, the steering angle response set by the elliptical gear mechanism 2 is amplified and then is inputted to the power steering mechanism.

The shaft 9, together with an outer valve 13 disposed on its outer periphery, forms a known rotary valve. A steering output shaft 14 connected to the lower end of the outer valve 13 is connected to the gear mechanism 8 through a torsion bar 15. A pinion gear 16 fixed to the steering output shaft 14 engages with a rack gear 18 provided on a steering rod 17, thus forming a steering gear box 19. Arrangement following the shaft 9 including the power steering device and the steering gear box 19 is known in the art, and thus will not be described further in detail.

A conventional counter-force mechanism 20 is provided on the input shaft 3. That mechanism includes a cam body 21 formed integrally with the first elliptical gear 4 and disposed beneath the first elliptical gear 4. A roller 22 is urged by a cam body 21, thus acting as a cam follower.

A spring housing 23 is disposed in the casing 5, with its axis perpendicular to the axis of the input shaft 3, and two coil springs 24 and 25 having different spring constants are disposed within the spring housing 23. A piston 26 is slidably disposed in the spring housing 23, and is urged towards the input shaft 3 by the coil springs 24 and 25. A plate 27 formed integrally with the piston 26 protrudes from the spring housing 23, and is provided at its front end with a shaft 28 disposed parallel to the input shaft 3. A roller 22 is rotatably supported on the supporting shaft 28 and is pressed against the cam body 21 by the force from the springs 24 and 25.

Figure 3:
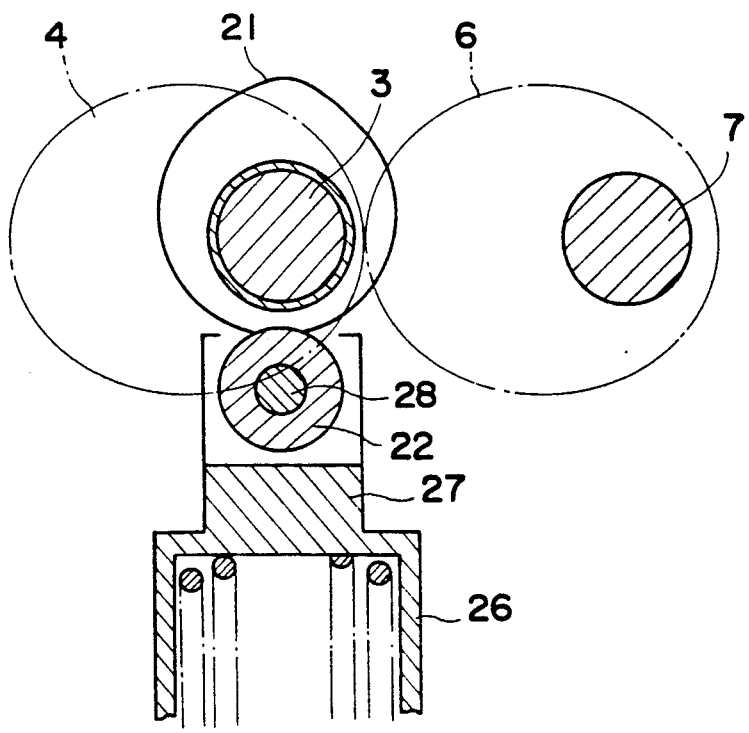
FIG. 3 is a schematic plan view of a counter-force mechanism.

As shown in FIG. 3, the cam body 21 is heart shape. The cam body 21 is disposed so that, with the steering wheel (not shown) at its central position, the smallest-radius portion of the heart-shaped cam surface contacts the roller 22. Therefore, the effective radius of the portion in contact with the roller 22 increases as the input shaft turns with an increasing steering angle of the steering wheel. Since the maximum rotation of the input shaft 3 is set to about a half turn, the effective radius of the cam body 21 will not decrease at large steering angles.

Now, functions of this embodiment will be described. Steering input from the steering wheel is transmitted to the planetary gear mechanism 8 via the first elliptical gear 4, the second elliptical gear 6, and the output shaft 7 and, after being amplified by the planetary gear mechanism 8, is transmitted to the steering gear box 19.

Figure 4:
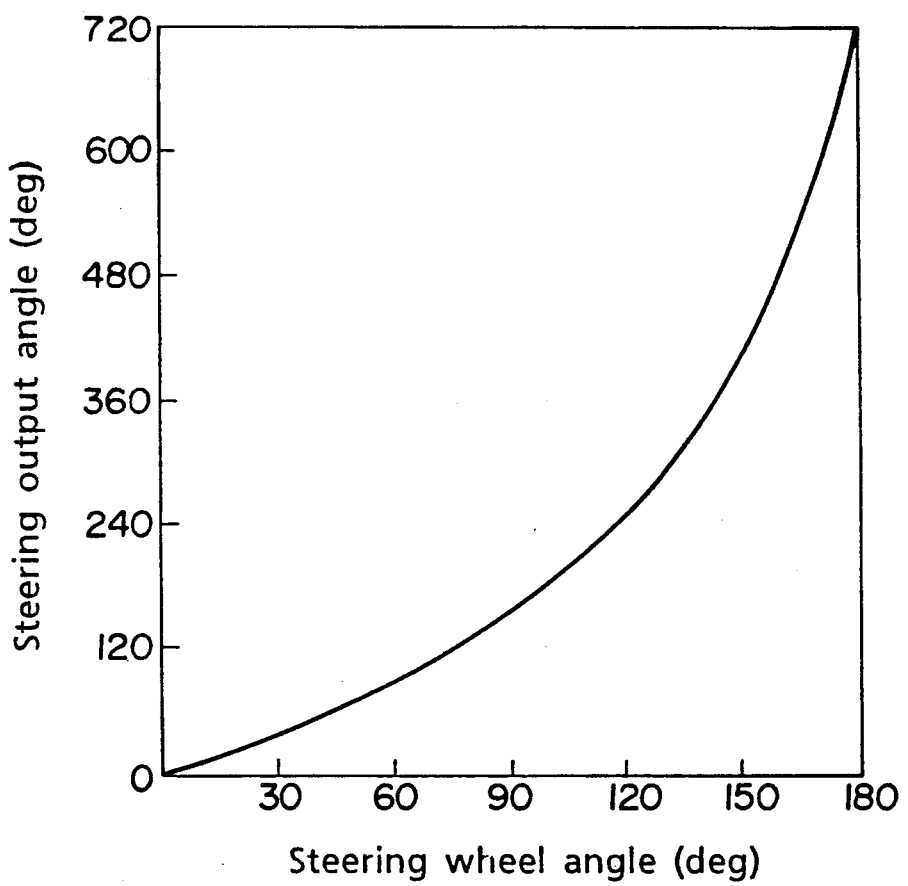
FIG. 4 is a graph showing steering angle characteristics.

Since, in the elliptical gear mechanism 2, the smallest-radius portion of the first elliptical gear 4 engages with the largest-radius portion of the second elliptical gear 6, the gear ratio of the elliptical gear mechanism 2 increases as the turning of the input shaft 3 increases. Thus, as can be seen from the steering angle characteristics of this embodiment as shown in FIG. 4, with the steering wheel in the vicinity of its central position, the initial response of the steered wheels is almost the same as that of conventional mechanisms. The response of the steered wheels increases as the steering angle increases, i.e., the steering gear ratio gradually increases with increasing steering angle. With such steering angle characteristics, the maximal steering angle of the steering wheel can be reduced to about a half turn.

In the counter-force mechanism 20, the springs 24 and 25 acting on the roller 22 through the counter-force piston increases with the rotation of the input shaft 3 (cam body 21) so that the engagement force of the roller 22 against the cam body 21 increases with the rotation of the input shaft. As a result, the resistance to rotation of the input shaft 3 increases with increasing steering angel, and the force required to operate the steering wheel progressively increases with increasing steering angle.

Figure 5:
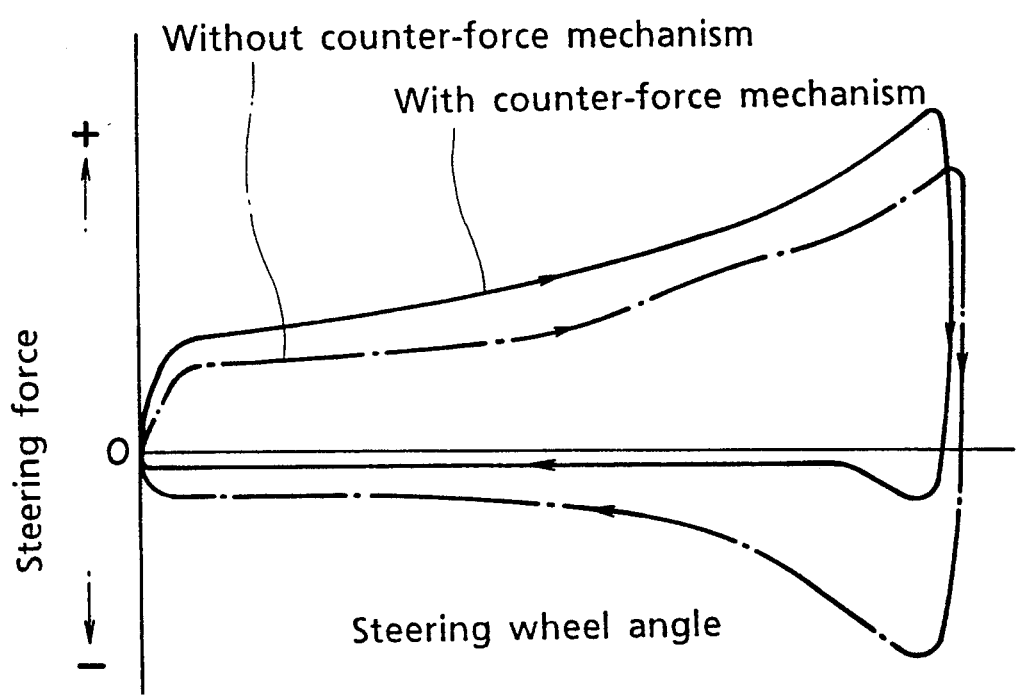
FIG. 5 is a diagram showing steering force characteristics.

FIG. 5 shows the steering force characteristics for the cases with or without the counter-force mechanism 20. Referring to FIG. 5, even without the counter-force mechanism 20, an increase in the steering force with increasing steering angle is obtained due to changes in gear ratio of the elliptical gear mechanism. The embodiment using the counter-force mechanism provides an enhanced steering force, of which the driver will be conscious, thus avoiding excessive oversteering angle even with careless steering operation of the driver. As can be seen from FIG. 5, when the steering wheel s returned to center, the counter-force mechanism 20 acts to facilitate the return of the steering wheel.

Since the cam body 21, with the steering wheel at the central position, has its smallest-radius portion in engagement with the roller 22, the central position of the steering wheel is clearly defined, thus enabling the driver to feel the central portion.

The steering force characteristic shown in FIG. 5 is only an example. The spring constant of the springs and the shape of the cam of the counter-force mechanism 20 can be changed to change the steering force characteristics, for example, to increase the resistance to steering force between the central position and the maximum steering angle position, or to increase the resistance of initial steering force from the central position.

As can also be seen from FIG. 5, since the basic characteristics of an increase in the steering force with increasing steering angle can be obtained by elliptical gear mechanism 2 alone, minimal performance is guaranteed in the event that the counter-force mechanism 2 is disabled or removed.

In this first embodiment, which is provided with the counter-force mechanism 20, the steering force characteristics can be set independently of the steering force characteristics of the elliptical gear mechanism 2, and steering force characteristics can be set to optimal ones by the setting of the counter-force mechanism 20. This prevents the steering response from becoming oversensitive in the vicinity of the central position and, in addition to preventing abrupt steering caused by a careless operation, improves the workability of the steering mechanism.

Since the output of the elliptical gear mechanism 2 is amplified by the planetary gear mechanism 8 and then inputted to the power steering device, the maximal rotational angle inputted to the power steering device can be set nearly equal to that of conventionally used power steering devices even with the reduced maximum steering angle of the steering wheel, and conventional power steering devices can be used as they are. This enables a low-cost, simple-structured fast reaction steering mechanism with power steering function.

Furthermore, by virtue of the central positioning functioning of the counter-force mechanism 20, the central position of the steering wheel is easily felt and, since an automatic centering function is achieved, return operation is facilitated, with improved stability of the vehicle during straight running.

In addition, since the basic characteristics of an increase in the steering force with increasing steering angle is obtained by the elliptical gear mechanism 2 only, minimal performance is guaranteed in the event that a malfunction occurs in the counter-force mechanism, thereby providing improved safety.

Figure 6:
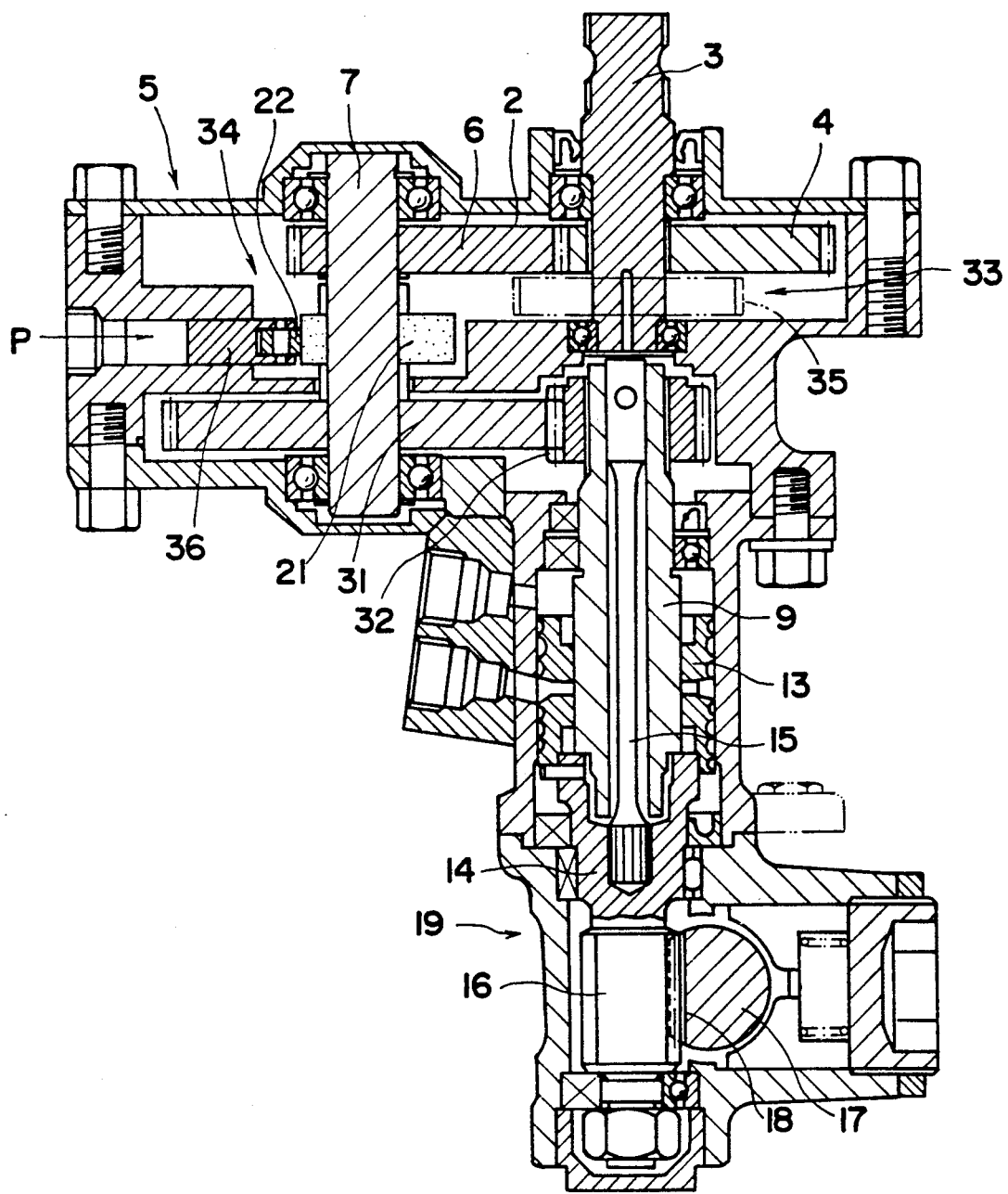
FIG. 6 is a schematic vertical sectional view of a second embodiment of the mechanism.
Figure 7:
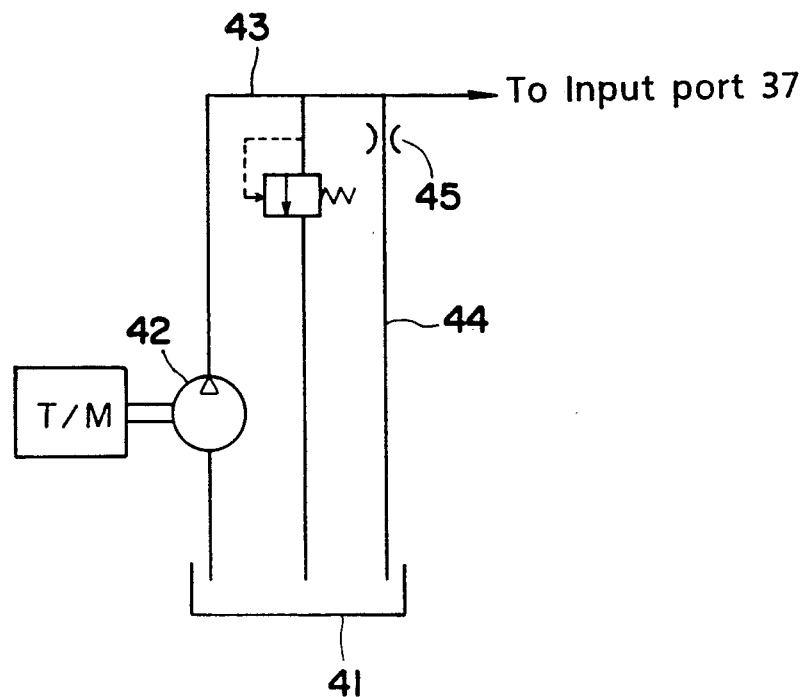
FIG. 7 is a schematic view showing structure of a hydraulic pressure supply device.
Figure 8:
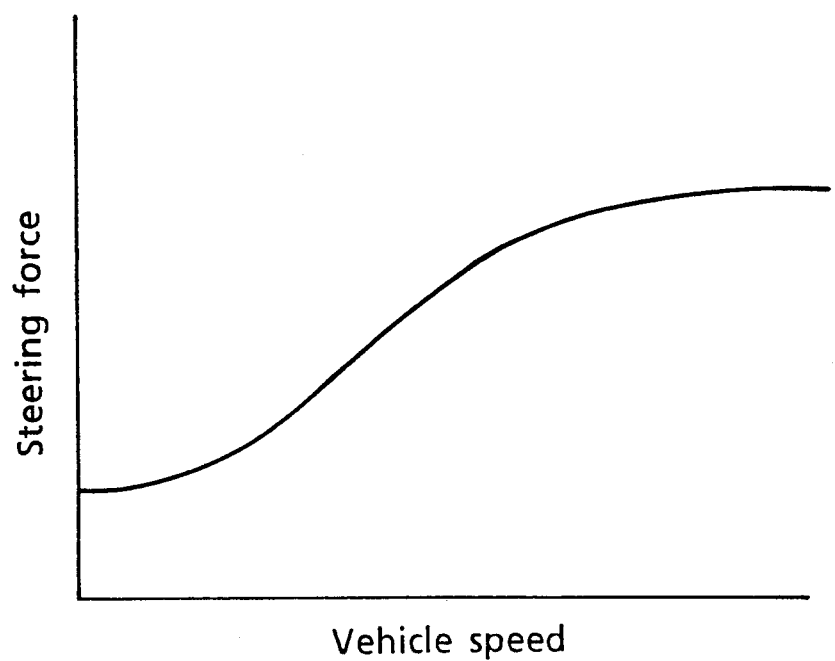
FIG. 8 is a graph showing steering force characteristics vs. vehicle speed.

FIGS. 6 to 8 relate to a second embodiment of the present invention. In the second embodiment, substantially same components as in the above first embodiment are indicated using the same reference numbers and symbols, and detailed description for the same is omitted.

In this second embodiment, the positions of the input shaft 3 and the output shaft 7 are the reverse of the first embodiment, the input shaft 3 being disposed coaxially with the steering output shaft 14.

In place of the planetary gear mechanism 8 of the first embodiment, a large-diameter helical gear 31 is connected to the output shaft 7 and a small-diameter helical gear 32 is connected to the shaft 9. In this embodiment, the helical gears 31 and 32 comprise the speed-increase mechanism. Rotation of the output shaft 7 is increased by the helical gears 31 and 32, and then inputted to the input valve 9.

In addition to the counter-force mechanism, there is provided a helical spring 35 for steering force control. The helical spring 35 is disposed around the input shaft 3 and reacts between the input shaft 3 and the casing 5. The spring is torsionally stressed by rotation of the input shaft 3, and acts to increase the resistance to rotation of the input shaft 3. The spring 35 has a similar effect to that of the counter-force mechanism 33 of the first embodiment.

The counter-force mechanism 34 has a cam 21A, which is similar in shape to one used in the first embodiment, mounted on the output shaft 7. A roller 22 contacts the cam body 21A. A plunger 36 is slidably in the casing 5 in a direction perpendicular to the output shaft 7. The roller 22 is rotatably supported on the front end of the plunger 36. Hydraulic pressure supplied from an input port 37 disposed in the casing 5 is applied to the rear end of the plunger 36. The force of the roller 22 pressing the cam body 21 varies with the hydraulic pressure inputted. Since the cam body has the same shape as in the first embodiment, the resistance to steering force increases with increasing steering angle, in dependence on the hydraulic pressure supplied to the input port 37.

FIG. 7 is a schematic view showing a generating mechanism for hydraulic pressure supplied to the input port 37. An oil pump 42, which sucks hydraulic oil from reserve tank 41, is driven by a gear provided on the transmission output shaft of the vehicle. Thus, the oil pump 42 rotates in response to the vehicle speed, and the pmp discharge increases with increasing vehicle speed. A discharge port of the oil pump 42 is connected to the input port 37 through an oil passage 43. The oil passage 43 is connected with an oil passage 44 which is connected to the reserve tank 41, the oil passage 44 being provided with a metering orifice 45. Due to the fixed flow resistance of the metering orifice 45, hydraulic pressure is generated upstream of the orifice 45 and, since the oil pump 42 discharges hydraulic oil in amounts proportional to the vehicle speed, the hydraulic pressure upstream of the orifice 45 increases in proportion to the vehicle speed. Thus, the input port 37 is applied with hydraulic pressure proportional to the vehicle speed.

A relief valve 46 is provided to return part of hydraulic oil to the tank 41 when flow rate of the oil pump exceeds a predetermined value, thereby preventing excessive hydraulic pressure being applied to the input port 37.

Since the hydraulic pressure inputted to the input port 37 varies in response to the vehicle speed, the force of the roller 22 pressing the cam body 21 also increases with increasing vehicle speed. As a result, resistance to rotation of the input shaft 3 also increases with the vehicle speed and, as shown in FIG. 8, characteristics are obtained in which the steering force increases with increasing vehicle speed. Additionally, due to the shape of the cam body 21A, the steering force increases with increasing steering angle.

Thus, while travelling at a high speed, the steering wheels cannot be operated excessively by careless steering operation, to the fact that the steering wheel requires a very large steering force, thus providing further improved safety. The steering wheel centering effect is obtained, as in the case of the first embodiment.

During low-speed travelling of the vehicle, there is almost no control over the steering force exerted by the counter-force mechanism 34. Due to the function of the spring 35, steering characteristics are then set so that the steering force increases with increasing steering angle, independently of setting of the elliptical gear mechanism 2.

With the second embodiment, since characteristics to increase the steering force proportionately to increasing vehicle speed, the driver is provided with a good feel of the steering during high-speed running of the vehicle, and abrupt steering by careless operation is more positively prevented.

Furthermore, since the input shaft 3 and the steering output shaft 14 are disposed in line on the same axis, the mechanism of this embodiment can be substituted in place of a conventional steering mechanism without modifying the vehicle body. Thus, the mechanism of this embodiment can be used interchangeably with conventional steering mechanisms according to the specification of the vehicle, thus enabling a wide range of applications.

Figure 9:
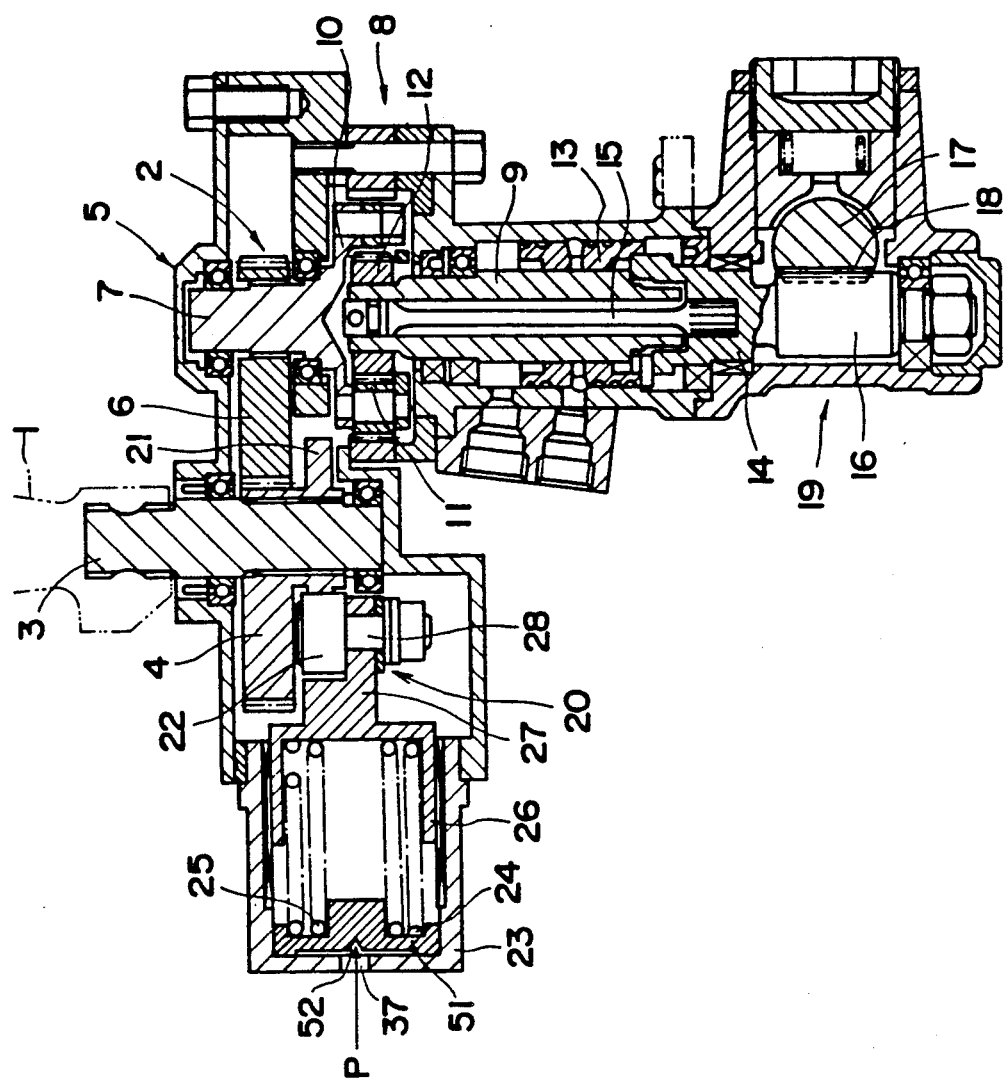
FIG. 9 is a schematic vertical sectional view of a third embodiment of the present invention.

FIG. 9 is a schematic view of a third embodiment of the present invention, which is a modification of the first embodiment. A hydraulic chamber 52 is formed between the bottom of the spring housing 23 and a spring retainer 51. In this third embodiment, hydraulic pressure proportional to the vehicle speed is introduced into the input port 37 to obtain the same feeling of vehicle speed as with the second embodiment.

Figure 10:
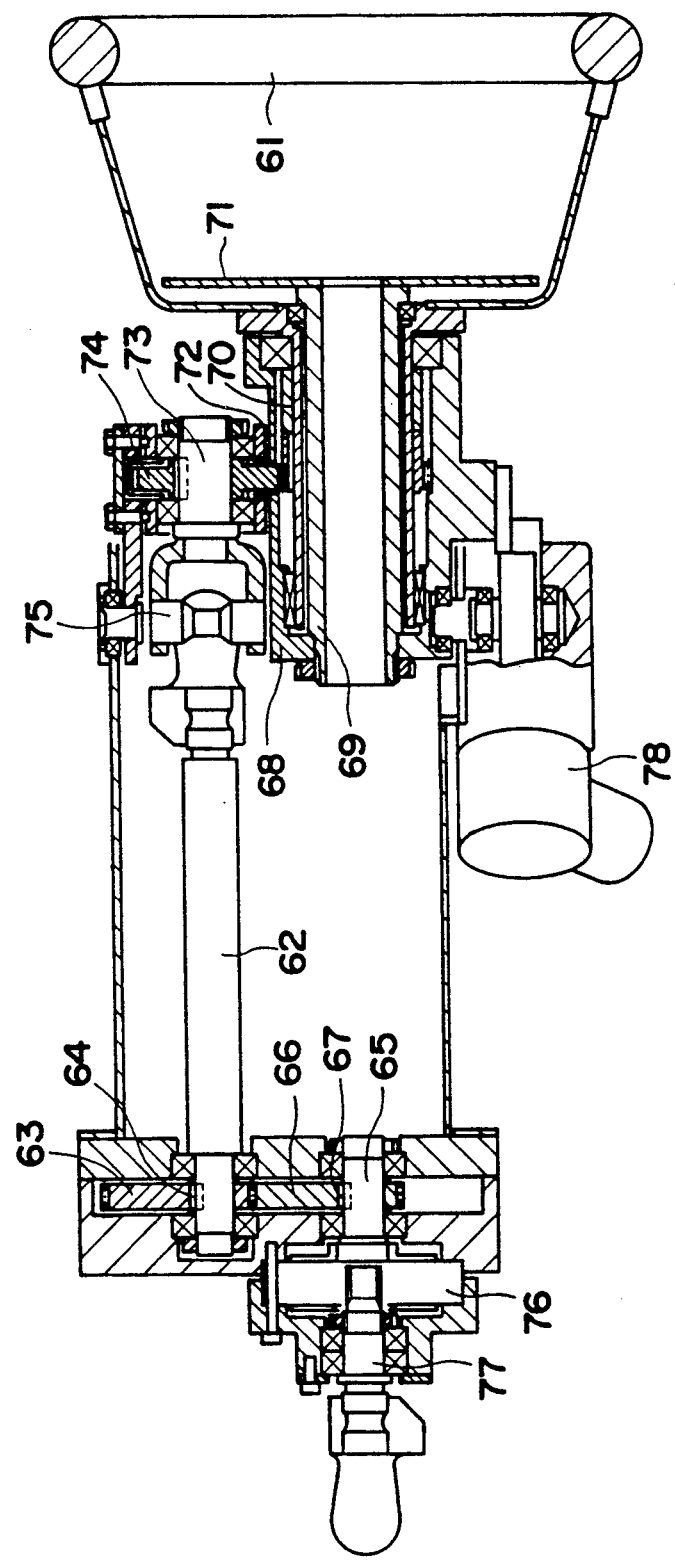
FIG. 10 is a schematic vertical sectional view of a fourth embodiment of the present invention.

FIG. 10 is a schematic vertical sectional view showing part of a fourth embodiment of the steering mechanism according to the present invention.

Referring to FIG. 10, an elliptical gear 63 is mounted by a key 64 on a first intermediate shaft 62 which is a first shaft rotatably driven by a steering wheel 61. An elliptical gear 66 engaging with the elliptical gear 63 is mounted by a key 67 on a second intermediate shaft 65, which drives a steering gear. When the steering wheel is turned, the first intermediate shaft rotates, and the rotation is transmitted to the second intermediate shaft 65 through a pair of elliptical gears 63 and 66 to drive the steering gears, thus changing the angle of steered wheels (not shown).

Phases of the gears 63 and 66 relative to the shafts 62 and 65 are set so that, when the angle of the steered wheels is zero, the smallest-radius portion of the elliptical gear 63 mounted on the first intermediate shaft 62 engages with the largest-radius portion of the elliptical gear 66. This is the same as in the case of the first embodiment.

Therefore, by connecting the first and second intermediate shafts 62 and 65 through such elliptical gears 63 and 66, it becomes possible to vary the steering gear characteristics according to the steering angle. Thus, since, in the vicinity of zero steering angle, the smallest-radius portion of the elliptical gear 63 of the first intermediate shaft 62 engages with the largest-radius portion of the elliptical gear 66 of the second intermediate shaft 65, rotation of the first intermediate shaft 62 is reduced and then transmitted to the second intermediate shaft 65. As a result, a state of a substantially low steering gear ratio is obtained, thereby ensuring safety during straight running of the vehicle.

On the other hand, the reduction gear is gradually decresed as the steering angle increases and, halfway, turns an increase in rotation rate. In the state that the elliptical gears 63 and 66 turn 180 degrees from the zero steering angle point, the largest-radius portion of the elliptical gear 63 of the first intermediate shaft 62 engages with the smallest-radius portion of the elliptical gear 66 of the second intermediate shaft 65. Rotation of the first intermediate shaft 66 is then transmitted to the second intermediate shaft 65 as an increase in rotation. This condition corresponds to that with a high steering gear ratio, and a steering operation requiring large steering angle, for example, when putting the vehicle in a garage.

As in the case of the previous embodiments, the fourth embodiment also enables steering angle characteristics in which the steering gear ratio increases with increasing steering angle. Furthermore, with the gear ratio characteristics, the steering force increases with increasing steering angle, which prevents abrupt steering of the steered wheels due to careless operation of the steering wheel.

FIG. 10 shows an example in which a fixed portion is provided at the center of the steering wheel 61, for the support of such instruments as a speed meter and various switches. Referring to FIG. 10, a hollow third steering shaft 70 is rotatably supported concentrically on the outer periphery of a hollow fourth shaft 69 fixed on a steering 68, and the steering wheel 61 is mounted at one end of the steering shaft 70. A device mounting plate 71 positioned at the center of the steering wheel 61 is mounted at one end of the hollow shaft 69.

A drive gear 72 is mounted on a steering shaft 70. The drive gear 72 engages with an adjacent driven gear 74 mounted on a driven shaft 73 which is supported on the casing 68. The driven shaft 73 is connected to the first intermediate shaft 62 through a universal joint 75. Therefore, when the steering wheel 61 is turned, the steering shaft 70 rotates, the driven shaft 73 is rotated through the gears 72 and 74, the rotation is transmitted to rotate the first intermediate shaft 62 through the universal joint 75.

Furthermore, as described above, the second intermediate shaft 65 which is connected to the first intermediate shaft 66 through the elliptical gears 63 and 66 is connected to an output shaft 77 through a speed-increase gear unit 76. Since the output shaft (not shown), the steering gear through a connecting shaft (not shown), the angle of the steered wheels is varied as the output shaft 77 rotates.

Numeral 78 indicates an electric tilt drive device to adjust the tilt angle of the steering wheel 61.

Although not shown, the device mounting plate 71 on the fixed hollow shaft 69 can be mounted with such instruments as a speed meter, switches and other devices, which can be wired through the hollow part of the fixed shaft 69.

When instruments are disposed at the center of the steering wheel 61, if the steering wheel 61 is shaped, for example, to a small-sized semi-circular form and the maximal rotational angle of the steering wheel 61 is limited within a range of requiring no shifting of hands, for example, within 180 degrees, visibility of the instruments will not be hindered with the driver's hands during operation of the steering wheel 61. In this case, the elliptical gears 63 and 66 of the present invention can be used to good advantage to obtain good steering gear characteristics.

In the embodiment shown in FIG. 10, the rotational ratio between the steering wheel 61 and the first intermediate shaft is 1:1, however, the elliptical gear 63 may alternatively be mounted on a shaft which increases or reduces the rotation of the steering wheel 61.

Furthermore, the above embodiment shows application of the elliptical gear mechanism as a variable ratio gear mechanism, however, it should be easily understood that mechanism of other shapes can be used alternatively.

We claim:

1. A small-angle steering apparatus comprising a variable ratio gear mechanism and a speed increasing gear mechanism connected in series and disposed in a steering transmission for mechanically connecting a steering wheel and a steering gear box to transmit rotation of said steering wheel to said steering gear box;

said variable ratio gear mechanism comprising a first gear having an elliptical shape with an eccentric axis connected to said steering wheel having an effective radius gradually increasing with an increasing steering angle of said steering wheel and a second gear having an elliptical shape with an eccentric axis connected to said speed increasing gear mechanism having an effective radius gradually decreasing with an increasing steering angle of said steering wheel, and, when said steering wheel is at its central position, having a smallest-radius portion of said first gear engaging with a largest-radius portion of said second gear;

further comprising a power steering control valve disposed between said speed increasing gear mechanism and an input shaft of said steering gear box, and said speed increasing gear mechanism being disposed between an output shaft of said variable ratio gear mechanism and an input shaft of a power steering control valve, maximum rotational angles of said first and second gears corresponding to a maximum rotation of said control valve input shaft of not more than 180°.

2. The small-angle steering apparatus of claim 1 wherein said variable ratio gear mechanism is an elliptical gear mechanism comprised of a pair of elliptical gears.

3. The small-angle steering apparatus of claim 1 wherein said power steering control valve comprises a rotary valve having an inner valve and an outer valve concentrically disposed and connected through a torsion bar, one of said inner valve and said outer valve being connected to said speed increasing gear mechanism and the other being connected to said input shaft of said steering gear box.

4. The small-angle steering apparatus of claim 1 wherein said variable ratio gear mechanism transmits rotation of a first shaft connected to said steering wheel to a second shaft, and said speed increasing gear mechanism comprises a pair of gears for transmitting rotation of said second shaft to a third shaft connected to the control valve, said first shaft and said third shaft being disposed in axial alignment.

5. The small-angle steering apparatus of claim 1 wherein said variable ratio gear mechanism transmits rotation of a first shaft connected to said steering wheel to a second shaft, and said speed increasing gear mechanism comprises a planetary gear mechanism for transmitting rotation of said second shaft to a third shaft connected to said control valve, said second shaft and said third shaft being disposed in axial alignment.

6. A small-angle steering apparatus comprising a variable ratio gear mechanism and a speed increasing gear mechanism connected in series and disposed in a steering transmission for mechanically connecting a steering wheel and a steering gear box to transmit rotation of said steering wheel to said steering gear box;

said variable ratio gear mechanism comprising a first gear having an elliptical shape with an eccentric axis connected to said steering wheel having an effective radius gradually increasing with an increasing steering angle of said steering wheel, and a second gear having an elliptical shape with an eccentric axis connected to said steering box having an effective radius gradually decreasing with an increasing steering angle of said steering wheel, and, when said steering wheel is at its central position, having a smallest-radius portion of said first gear engaging with a largest-radius portion of said second gear; said speed increasing gear mechanism being disposed between an output shaft of said variable ratio gear mechanism and an input shaft of said steering gear box, maximum rotation of said input shaft being not more than 180°.

further comprising a counter-force mechanism disposed in said steering transmission mechanism for applying a pressure in an axial direction, said counter-force mechanism including a cam body mounted on a rotary shaft rotating with said variable ratio gear mechanism, and in element urged by a strong resilient means and pressed against the surface of said cam body, an effective radius of the portion of said cam body in contact with said resiliently pressed element being minimal when said steering wheel is in a central position and increasing with an increasing steering angle of said steering wheel.

7. A small-angle steering apparatus comprising a variable ratio gear mechanism and a speed increasing gear mechanism connected in series and disposed in a steering transmission for mechanically connecting a steering wheel and a steering gear box to transmit rotation of said steering wheel to said steering gear box; said variable ratio gear mechanism comprising a first gear having an elliptical shape with an eccentric axis connected to said steering wheel having an effective radius gradually increasing with an increasing steering angle of said steering wheel and a second gear having an elliptical shape with an eccentric axis connected to said speed increasing gear mechanism having an effective radius gradually decreasing with an increasing steering angle of said steering wheel, and, when said steering wheel is at its central position, having a smallest-radius portion of said first gear engaging with a largest-radius portion of said second gear;

said speed increasing gear mechanism being disposed between an output shaft of said variable ratio gear mechanism and an input shaft of said steering gear box, maximum rotational angles of said first and second gears corresponding to a maximum rotation of said input shaft of not more than 180°;

further comprising a counter-force mechanism disposed in said steering transmission for applying a pressure in an axial direction, and said counter-force mechanism being operated by hydraulic pressure generated by an oil pump driven by a driving engine of a vehicle, whereby increasing rotational resistance of said steering transmission in proportion to an increase in speed of said vehicle.

8. A small-angle steering apparatus comprising a variable ratio gear mechanism and a speed increasing gear mechanism connected in series and disposed in a steering transmission for mechanically connecting a steering wheel and a steering gear box to transmit rotation of said steering wheel to said steering gear box;

said variable ratio gear mechanism comprising a first gear having an elliptical shape with an eccentric axis connected to said steering wheel having an effective radius gradually increasing with an increasing steering angle of said steering wheel, and a second gear having an elliptical shape with an eccentric axis connected to said speed increasing gear mechanism having an effective radius gradually decreasing with an increasing steering angle of said steering wheel, and, when said steering wheel is at its central position, having a smallest-radius portion of said first gear engaging with a largest-radius portion of said second gear;

said speed increasing gear mechanism being disposed between an output shaft of said variable ratio gear mechanism and an input shaft of said steering gear box, maximum rotational angles of said first and second gears corresponding with a maximum rotation of said input shaft of not more than 180°;

said variable ratio gear mechanism transmitting rotation of a first shaft connected to said steering wheel to a second shaft, said speed increasing gear mechanism comprising a planetary gear mechanism for transmitting rotation of said second shaft to a third shaft connected to said steering gear box, said second shaft and said third shaft being disposed in axial alignment.

further comprising a hollow fourth shaft having a gear mounted on the outer periphery of said fourth shaft engaged with a gear connected to said first shaft, a supporting shaft of said steering wheel inserted within said fourth shaft, and a fixed shaft inserted in said supporting shaft of said steering wheel and secured to a fixed member, whereby instruments at least one instrument can be mounted to said fixed shaft and disposed at the center of said steering wheel.

* * * * *